United States Patent
Taylor et al.

(10) Patent No.: US 10,532,783 B2
(45) Date of Patent: Jan. 14, 2020

(54) ROTISSERIE FIXTURE FOR ASSEMBLY OF A VEHICLE

(71) Applicant: Honda Motor Co., Ltd., Tokyo (JP)

(72) Inventors: Matthew Taylor, Columbus, OH (US);
Mark Bowman, Cable, OH (US);
Werner Wilson, Marysville, OH (US);
Steven Boyer, Marysville, OH (US);
Donald K Ingles, La Rue, OH (US);
Sandip Suvedi, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 784 days.

(21) Appl. No.: 14/853,424

(22) Filed: Sep. 14, 2015

(65) Prior Publication Data

US 2017/0073027 A1    Mar. 16, 2017

(51) Int. Cl.
*B62D 65/02* (2006.01)
*B23Q 3/04* (2006.01)
*B62D 65/18* (2006.01)

(52) U.S. Cl.
CPC ............ *B62D 65/022* (2013.01); *B23Q 3/04* (2013.01); *B23Q 2703/10* (2013.01); *B62D 65/18* (2013.01)

(58) Field of Classification Search
CPC ........ B23Q 3/04; B23Q 1/64; B23Q 2703/10; B62D 65/022; B62D 65/00
USPC .......................................................... 269/71
See application file for complete search history.

(56) References Cited

U.S. PATENT DOCUMENTS

| | | |
|---|---|---|
| 1,288,138 A | 12/1918 | Nicoson |
| 2,931,644 A | 4/1960 | Kenworthy |
| 3,087,631 A | 4/1963 | Kocher |
| 3,415,342 A | 12/1968 | Hott |
| 3,657,794 A * | 4/1972 | Palumbo ............ B23K 37/0443 29/281.5 |
| 3,734,466 A | 5/1973 | Mason |
| 3,868,101 A | 2/1975 | Nozaki et al. |
| 4,533,127 A * | 8/1985 | Hawkins ................. B66C 23/48 269/17 |
| 4,599,034 A | 7/1986 | Kennedy et al. |
| 4,637,540 A | 1/1987 | Fujita et al. |
| 4,686,925 A | 8/1987 | Stuck |

(Continued)

FOREIGN PATENT DOCUMENTS

WO    2013/135995    9/2013

*Primary Examiner* — Sean K. Hunter
*Assistant Examiner* — Thomas Raymond Rodgers
(74) *Attorney, Agent, or Firm* — Honda Patents & Technologies North America, LLC; Mark E. Duell

(57) ABSTRACT

An apparatus for lifting and rotating a frame of a motor vehicle includes a rotisserie and a rotatably connected fixture that holds the motor vehicle frame during production. The fixture includes clamps extending from arms of the fixture and clamps extending from the front support for affixing the frame of the motor vehicle to the fixture. The fixture may further include a passive lock mechanism for engaging a side sill of the frame that includes a latch, a locking extension, a latch spring that holds the latch in engagement with the frame, and a pendulum that rotates relative to the fixture but remains oriented in a fixed location relative to horizontal. The latch may only be disengaged from the frame when the locking extension is aligned to be received by a slot in the pendulum when the fixture is rotated to the home location.

7 Claims, 15 Drawing Sheets

(56) References Cited

U.S. PATENT DOCUMENTS

| | | | |
|---|---|---|---|
| 4,813,843 A * | 3/1989 | Gilmour | B66F 7/22 |
| | | | 254/94 |
| 5,051,056 A | 9/1991 | Gibbons et al. | |
| 5,100,705 A | 3/1992 | Yamane et al. | |
| 5,141,211 A | 8/1992 | Adams | |
| 5,174,711 A | 12/1992 | Binder et al. | |
| 5,236,065 A | 8/1993 | Isogai | |
| 5,238,361 A | 8/1993 | Liqui | |
| 5,269,501 A * | 12/1993 | Liegel | B66F 9/06 |
| | | | 212/292 |
| 5,328,161 A * | 7/1994 | Stuck | B23K 37/0426 |
| | | | 269/17 |
| 5,338,015 A * | 8/1994 | Liegel | B66F 9/06 |
| | | | 254/134 |
| 5,339,926 A | 8/1994 | McCanse et al. | |
| 5,505,578 A | 4/1996 | Fuller | |
| 5,617,622 A * | 4/1997 | Anderson | B21F 27/20 |
| | | | 269/37 |
| 6,279,217 B1 * | 8/2001 | Gallinger | B23K 37/0229 |
| | | | 29/281.1 |
| 6,296,239 B1 * | 10/2001 | Sawyer | B05B 13/0228 |
| | | | 269/17 |
| 6,322,061 B1 * | 11/2001 | Maser | B25H 1/0007 |
| | | | 269/17 |
| 6,533,260 B1 * | 3/2003 | Mock | A61G 7/08 |
| | | | 254/133 R |
| 7,237,758 B2 | 7/2007 | Nikolic | |
| 7,377,502 B2 | 5/2008 | Nikolic | |
| 7,429,035 B2 * | 9/2008 | Metcalf | B66C 23/48 |
| | | | 248/125.2 |
| 7,878,753 B2 | 2/2011 | Kielian et al. | |
| 7,896,324 B2 * | 3/2011 | Okazaki | B62D 65/18 |
| | | | 269/17 |
| 8,245,856 B1 | 8/2012 | Pappin et al. | |
| 8,328,173 B1 * | 12/2012 | DesForge | B25H 1/0007 |
| | | | 248/176.1 |
| 8,596,627 B2 * | 12/2013 | Lands | B25H 1/0007 |
| | | | 254/2 B |
| 9,016,664 B1 * | 4/2015 | Powers | B05C 13/02 |
| | | | 254/2 B |
| 2003/0062663 A1 | 4/2003 | Fox | |
| 2005/0212191 A1 * | 9/2005 | McKelvie | B60S 13/00 |
| | | | 269/17 |
| 2009/0184217 A1 * | 7/2009 | Sprout | B05B 13/0285 |
| | | | 248/124.1 |
| 2009/0199383 A1 | 8/2009 | Winter, Jr. et al. | |
| 2012/0030924 A1 * | 2/2012 | Kilibarda | B62D 65/026 |
| | | | 29/525.01 |
| 2012/0181735 A1 * | 7/2012 | Ooe | B62D 65/18 |
| | | | 269/17 |
| 2012/0297606 A1 | 11/2012 | Winter, Jr. et al. | |
| 2016/0023870 A1 * | 1/2016 | Kim | B66F 7/28 |
| | | | 29/559 |

* cited by examiner

ROTISSERIE FIXTURE FOR ASSEMBLY OF A VEHICLE

BACKGROUND

A rotisserie fixture so a vehicle frame or body may be lifted, lowered, or rotated 360° about a longitudinal axis so that assembly steps may be performed with the vehicle frame or body in an optimal position for a manufacturing associate to complete an assembly step in a limited production manufacturing environment.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect of the invention, an apparatus for use in production of a motor vehicle to lift a frame of the motor vehicle and rotate the frame 360° about a longitudinal axis includes a rotisserie and a fixture rotatably connected to the rotisserie for holding the frame of the motor vehicle during production and rotatable about the longitudinal axis. The fixture further includes a mounting plate attached to the rotisserie, a support structure comprising a lateral support that connected to the mounting plate, first and second longitudinal arms having first ends connected to extending longitudinally from the lateral support, and a front support extending between second ends of the first and second longitudinal arms, first and second clamps extending from the first ends of the first and second longitudinal arms for affixing the frame of the motor vehicle to the support structure, and third and fourth clamps extending from the front support for affixing the frame of the motor vehicle to the support structure.

According to another aspect of the invention, An apparatus for use in production of a motor vehicle to lift a frame of the motor vehicle and rotate the frame 360° about a longitudinal axis includes a rotisserie and a fixture rotatably connected to the rotisserie for holding the frame of the motor vehicle during production and rotatable about the longitudinal axis. The fixture further includes a mounting plate attached to the rotisserie a support structure including and a lateral support that connected to the mounting plate, first and second longitudinal arms having first ends connected to extending longitudinally from the lateral support, and a front support extending between second ends of the first and second longitudinal arms. A lock mechanism for engaging a side sill of the frame includes a latch, the latch having a inclined top for allowing the frame to be loaded onto the fixture, thereby creating an interference fit to lock the frame onto the fixture, the latch also having a locking extension, a latch spring that holds the latch in engagement with the frame, a pendulum that rotates relative to the fixture but remains oriented in a fixed location relative to the rotisserie, the pendulum having a slot for receiving the locking extension when the fixture is rotated to a home location, and wherein the latch may only be disengaged from the frame when the locking extension is aligned to be received by the slot when the fixture is rotated to the home location.

The figures depict various embodiments of the embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
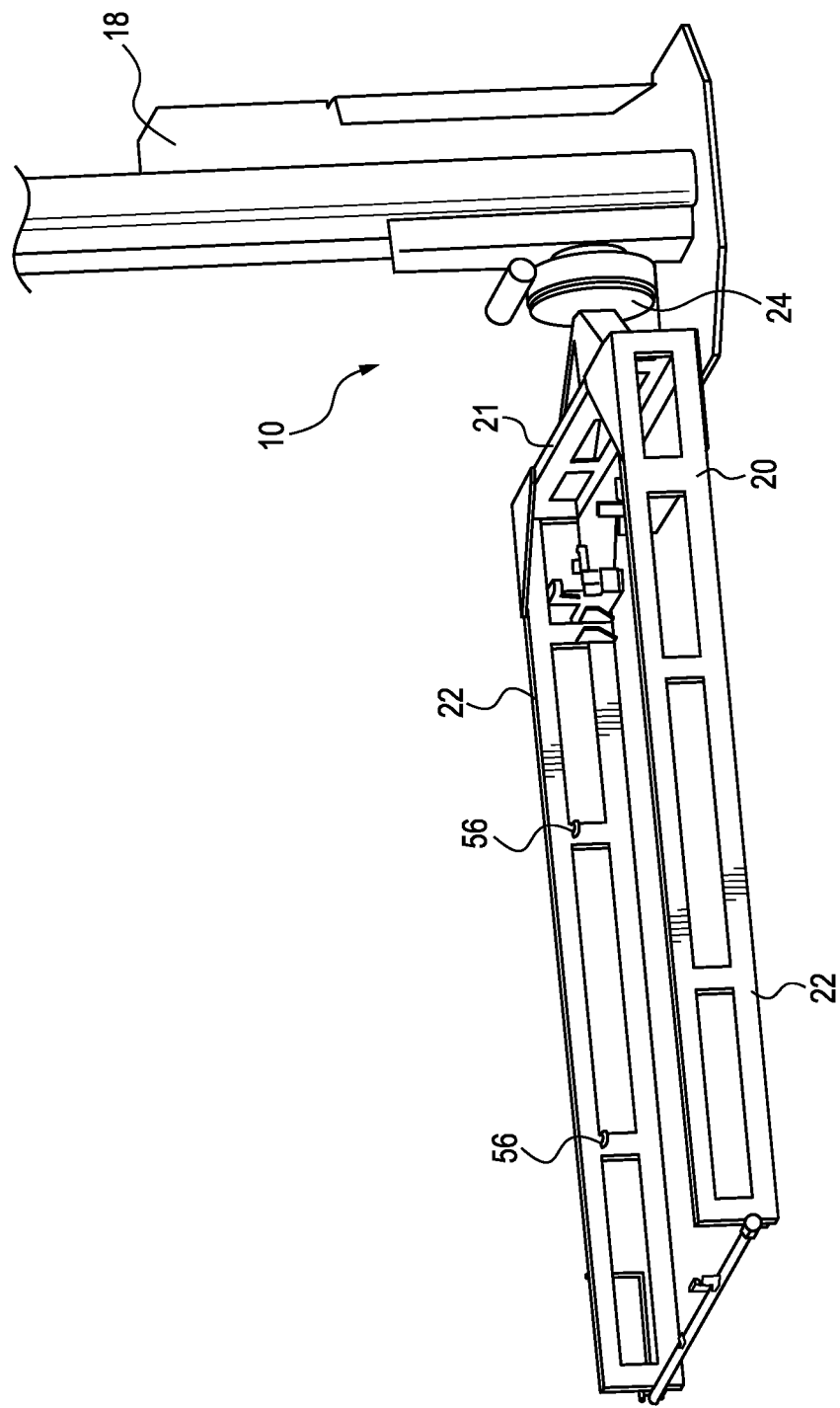
FIG. 1 is a perspective view of a rotisserie fixture.
Figure 2:
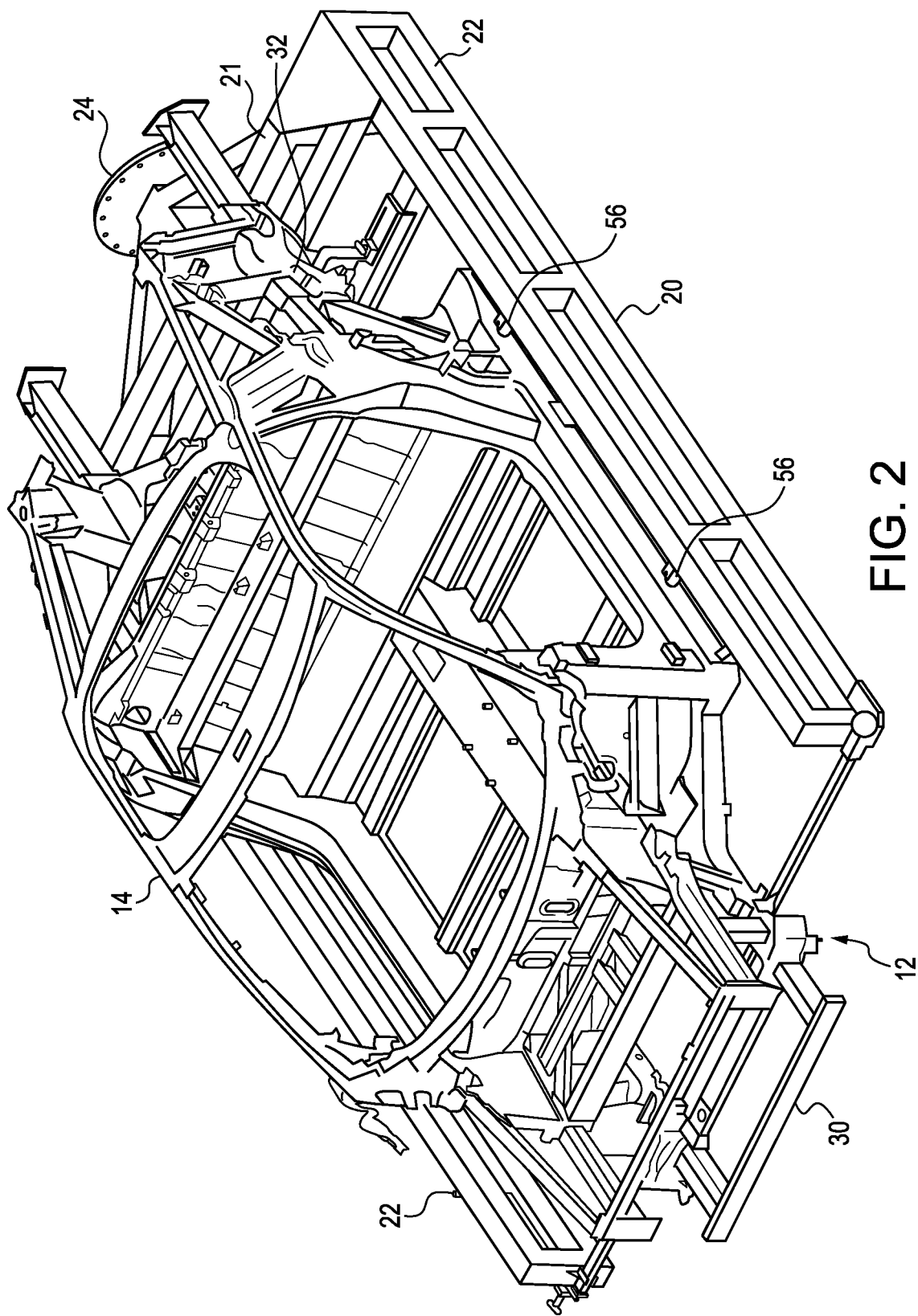
FIG. 2 is a perspective view of a fixture holding a motor vehicle body.
Figure 3:
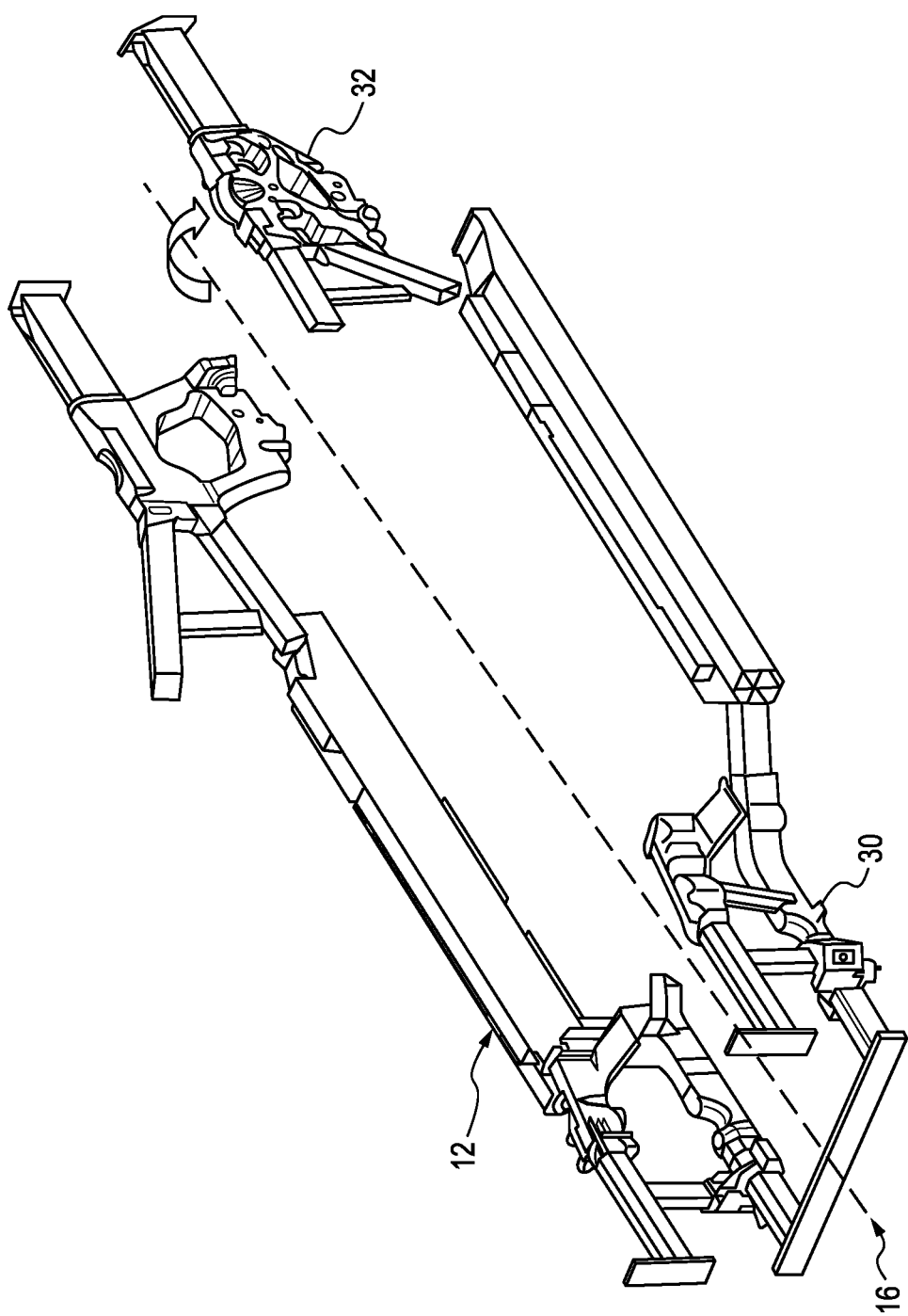
FIG. 3 is a perspective view of a motor vehicle frame.

The purpose of a rotisserie fixture, as shown in FIGS. 1-3, is to allow for the frame 12 of a motor vehicle body 14 to be lifted and rotated 360° about a longitudinal axis 16 in a limited production manufacturing environment. This rotisserie fixture allows 10 for more ergonomic positioning of the frame 12 of the motor vehicle body 14 for manufacturing associates during various processes.

Figure 4:
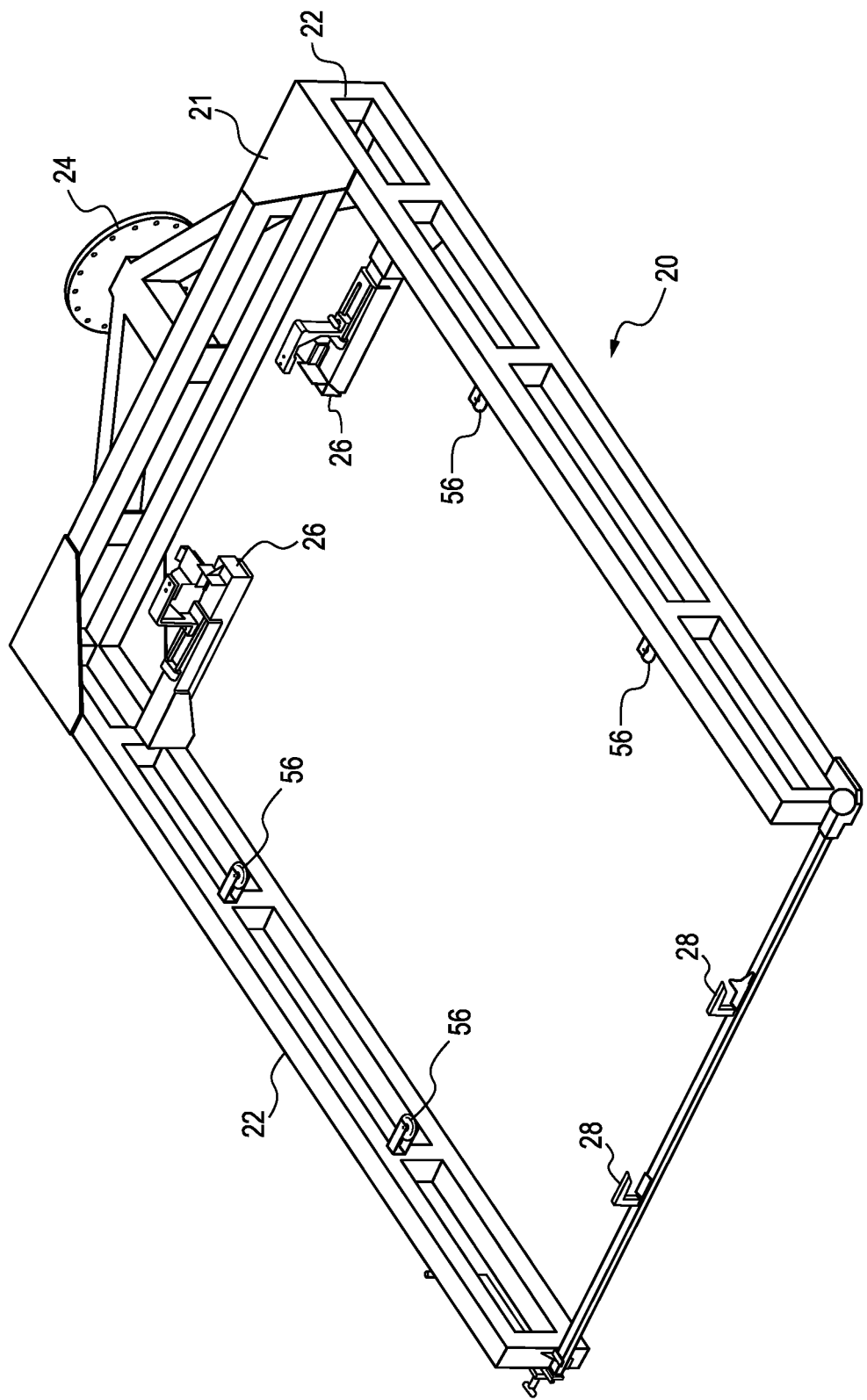
FIG. 4 is a perspective view of a fixture.
Figure 5:
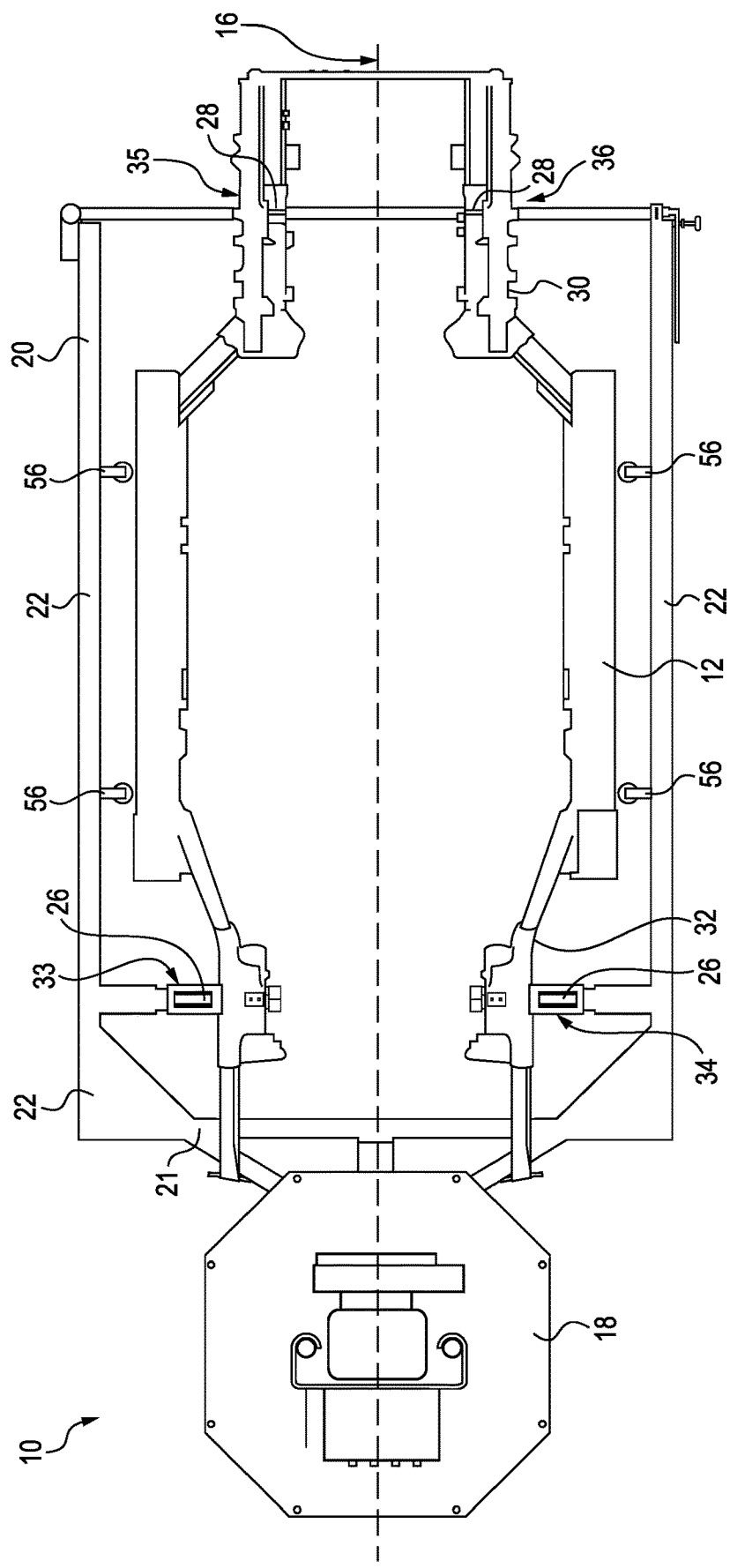
FIG. 5 is an overhead view of a rotisserie fixture.

The embodiment illustrated in the drawings includes rotisserie 18 and a fixture 20. The fixture 20 further includes a transverse support 21, two supporting arms 22 extending from the transverse support 21, and a mounting plate 24 that attaches the transverse support 21 to the rotisserie 18. In the embodiment shown and further illustrated in FIGS. 4-5, clamps 26, 28 secure the motor vehicle frame 12 to the fixture 20. Clamps 26, 28 are preferably located at four (4) location points 33,34,35,36 on the fixture 20. Two (2) clamps 28 secure the front 30 of the motor vehicle frame 12 at the two (2) front location points 35,36, and two (2) clamps 26 secure the rear 32 of the motor vehicle frame 12 to the fixture 20 at the two (2) rear location points 33,34. The fixture 20 should preferably hold the motor vehicle frame securely while the frame 12 and motor vehicle body 14 rotate 360° about the longitudinal axis 16.

Figure 6:
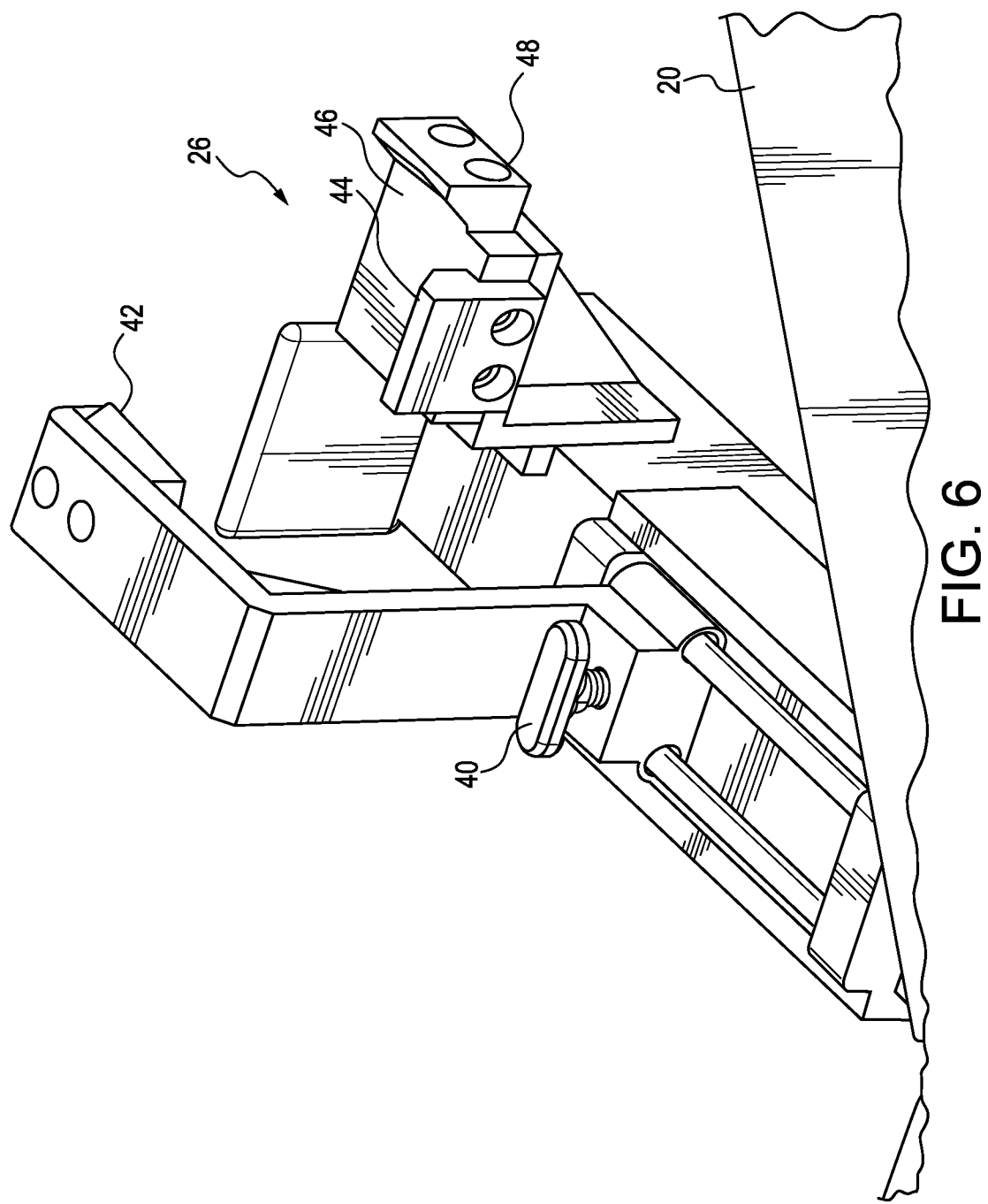
FIG. 6 is a close up view of a clamp on the fixture.
Figure 7:
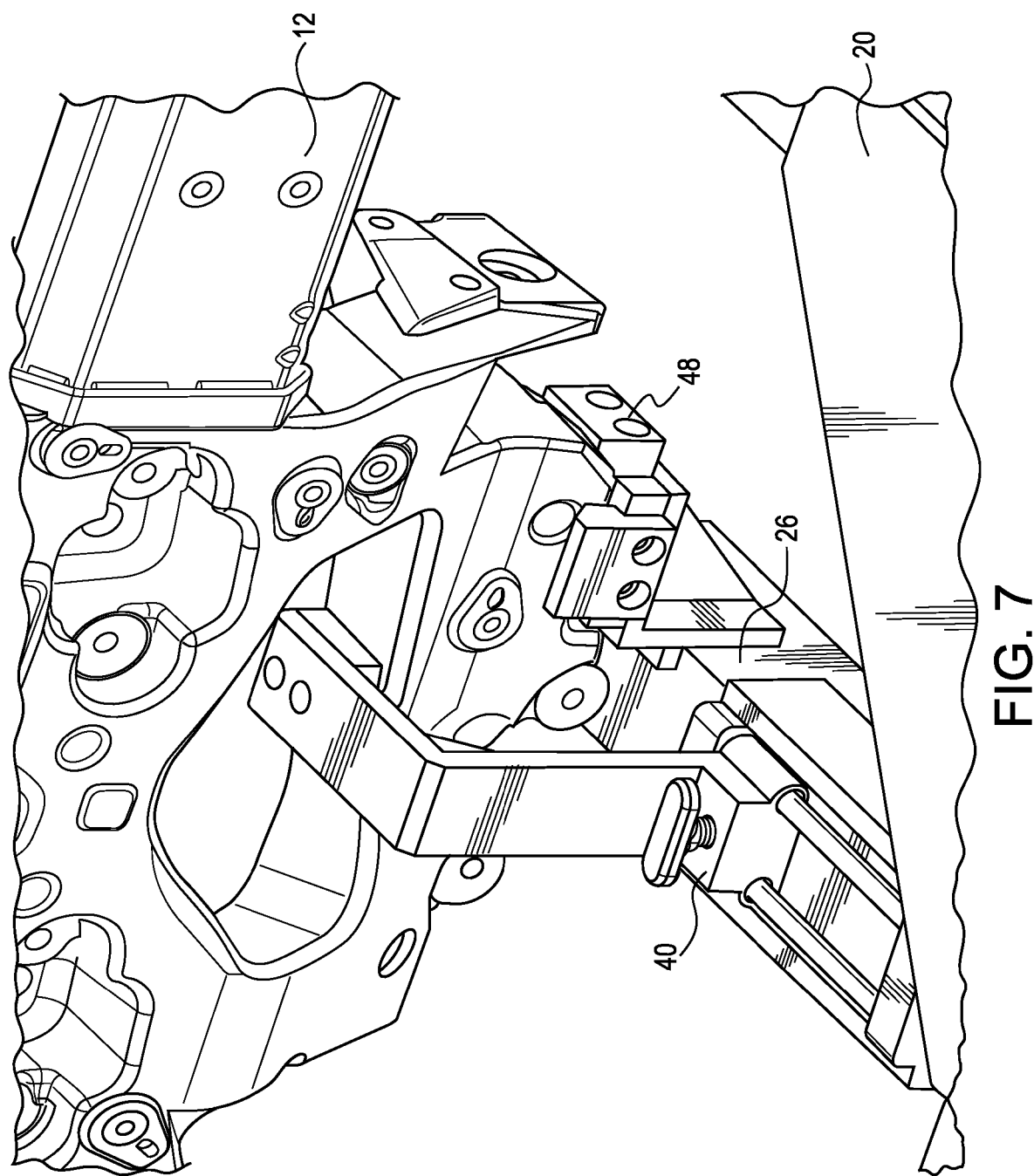
FIG. 7 is a close up view of a clamp on the fixture engaged with motor vehicle frame.

As shown in FIGS. 6-7, attachment clamps 26 are preferably quick latching so that easy engagement and disengagement of the motor vehicle frame 12 from the fixture 20 can occur by a single manufacturing associate. In the embodiment illustrated in FIG. 6, a quick releasing pin 40 is used to aid in the engagement and disengagement of each of the rear clamps 26. While the clamps 26 illustrated in the embodiments of shown in the Figures are designed to be operated manually, the clamps 26 may also include pneumatic or electrical devices, not shown, installed to assist the manufacturing associate in the clamping process.

According to the embodiments described herein, the rear clamps 26 pins 40 should preferably be releasable and detachable from outside the motor vehicle frame 12 by a manufacturing associate stationed outside of the motor vehicle frame 12. Each clamp 26,28 should have three (3) points of contact 42,44,46 with the motor vehicle frame 12, which preferably includes the top 42, the bottom 46, and at least one (1) side 44 at each attachment point 33,34,35,36 of the clamp 26,28 to the motor vehicle frame 12. This acts to fixedly secure the motor vehicle frame 12 to the fixture 20, particularly as the motor vehicle frame 12 is rotated longitudinally by the rotisserie 18.

In another embodiment, proximity switch brackets may be installed to each clamp 26,28 to allow for installation of proximity switches 48. Proximity switches 48 may be used to determine if clamps 26,28 are fully engaged and secured to the motor vehicle frame 12. Operation of the proximity switches 48 may be carried out in any way known by those skilled in the art.

The rear supporting clamps 26 should preferably be permanently fixed in space to the fixture 20.

Figure 8:
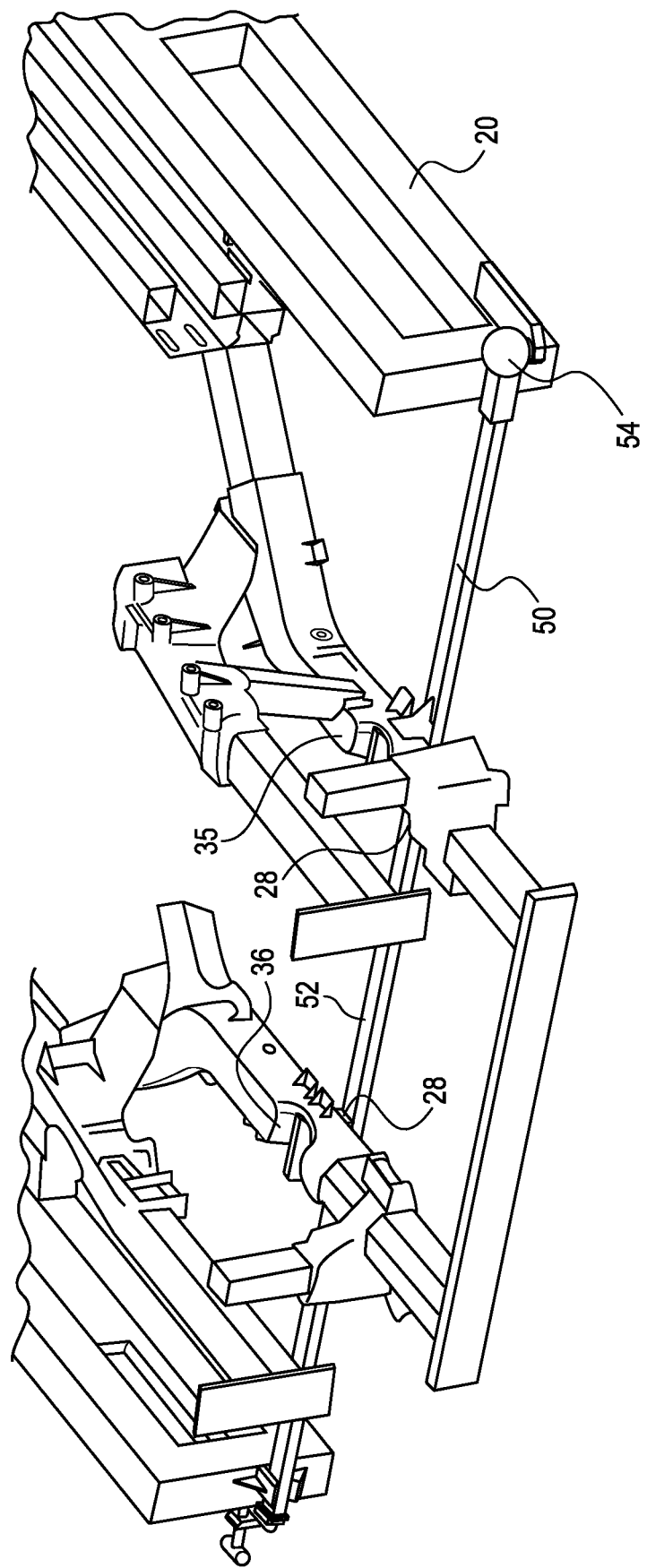
FIG. 8 is a close up view of a front portion of the fixture.
Figure 9:
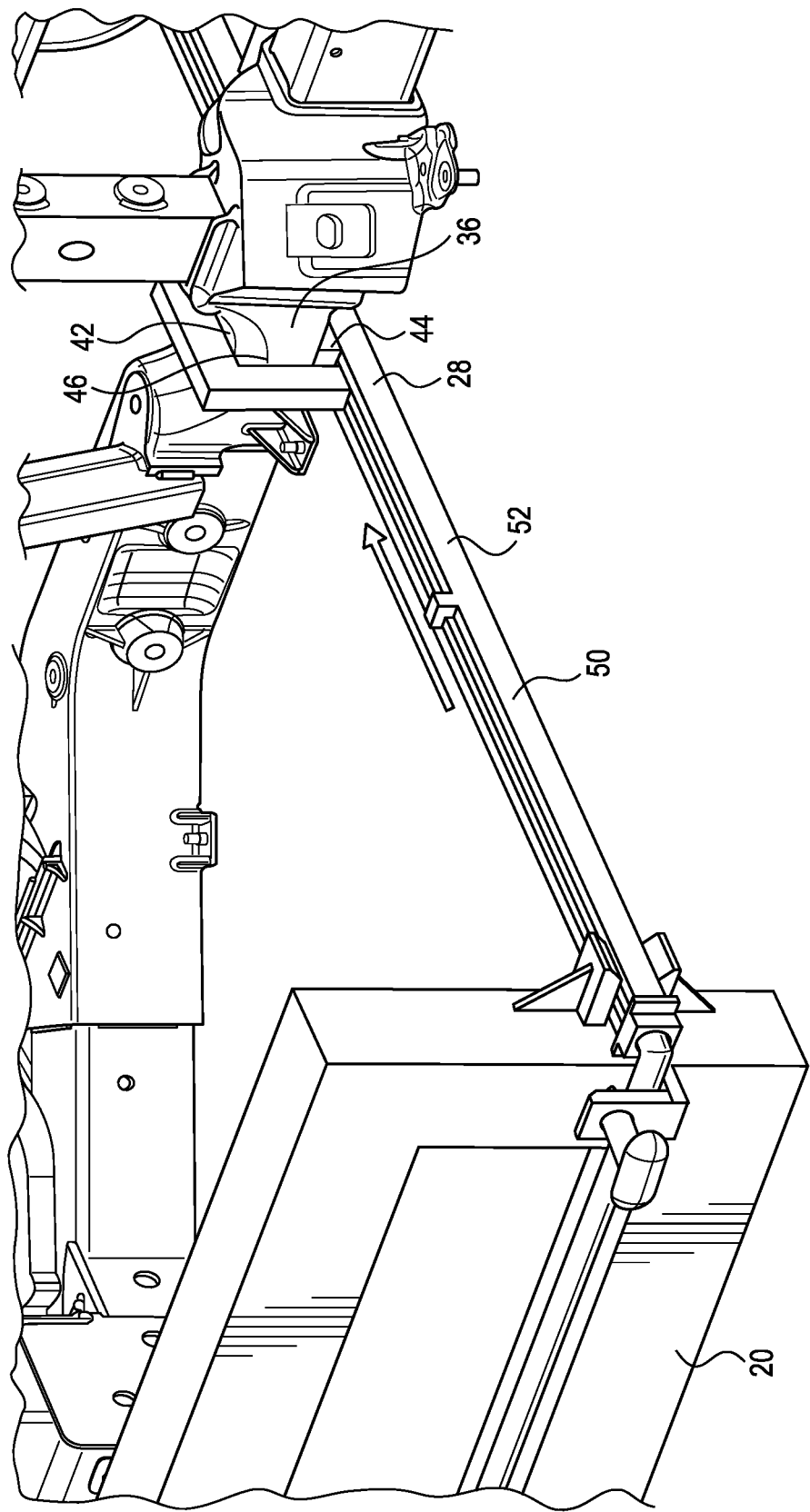
FIG. 9 is a close up view of a front portion of the fixture.
Figure 10:
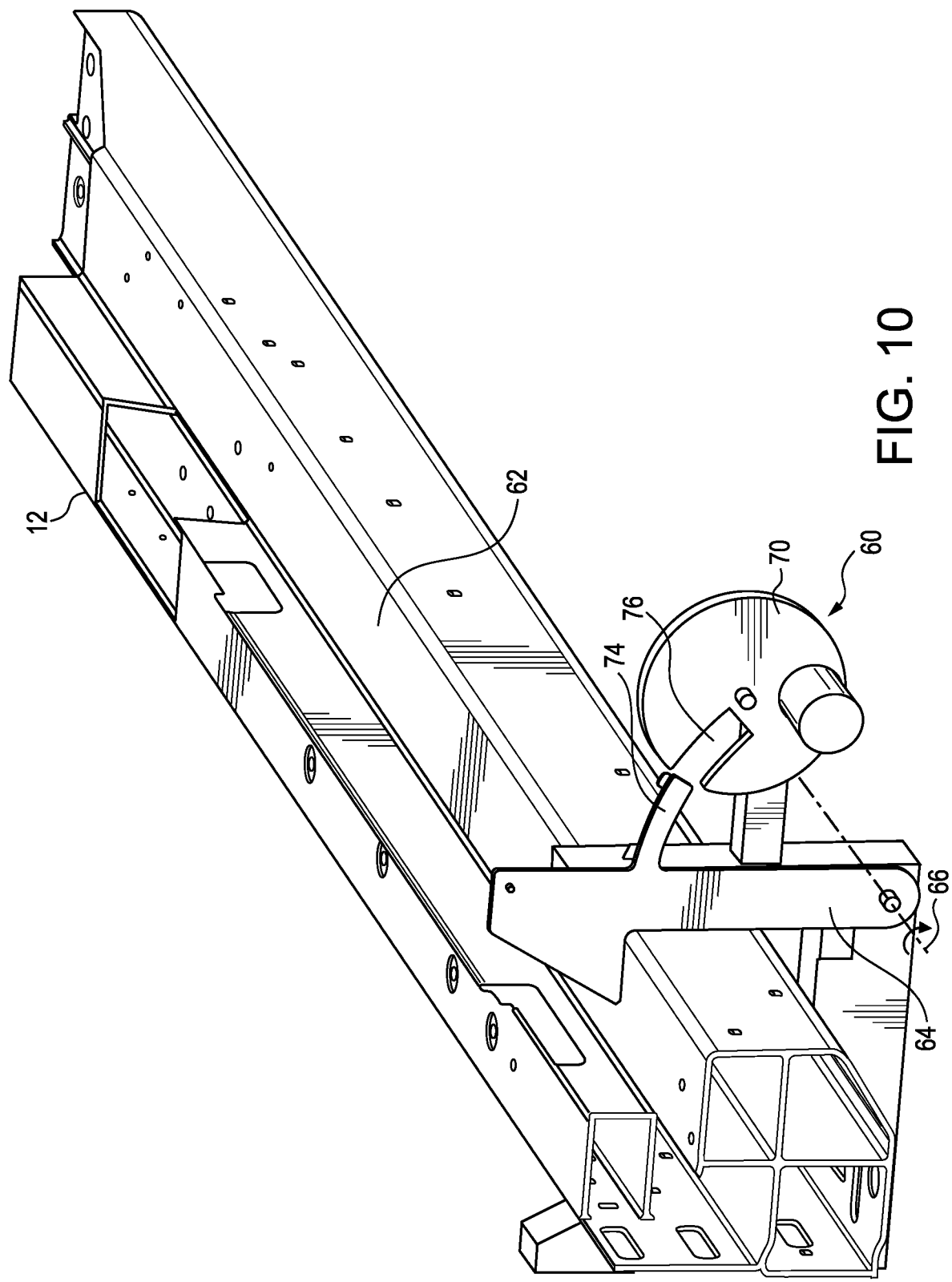
FIG. 10 is a perspective view showing a front view of an alternate embodiment latching apparatus.
Figure 11:
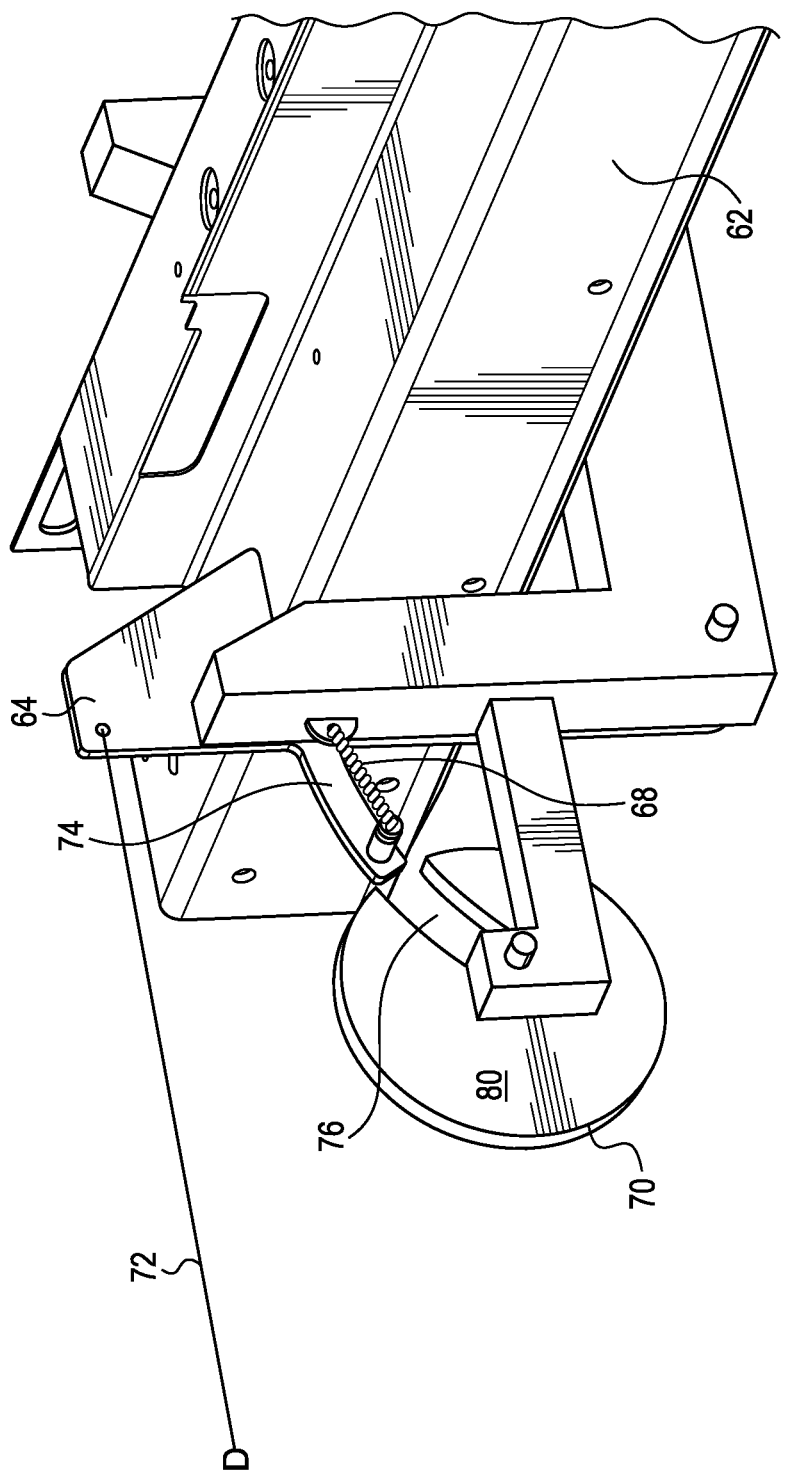
FIG. 11 is a perspective view showing a rear view of an alternate embodiment latching apparatus.
Figure 12:
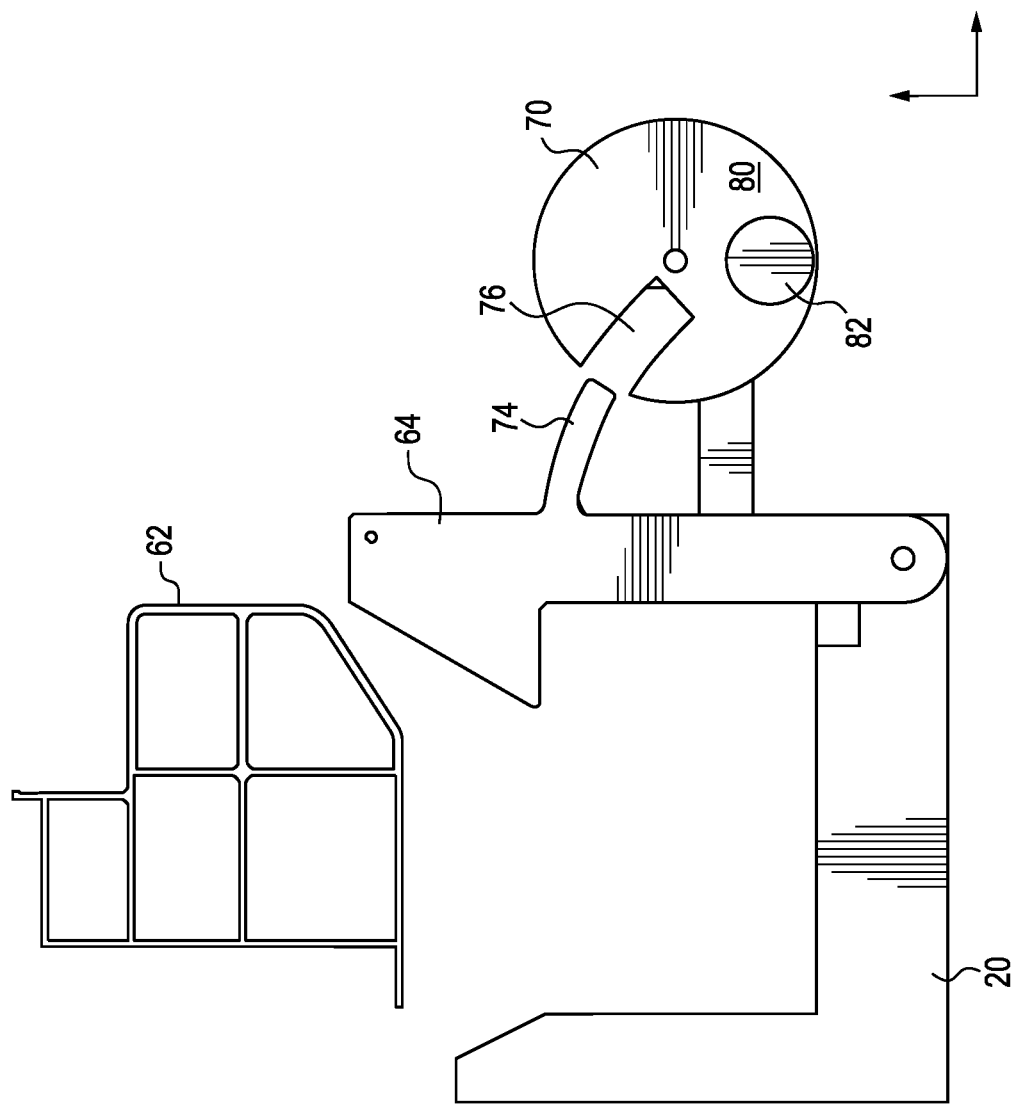
FIG. 12 is a front view showing a side sill being loaded into an alternate embodiment latching apparatus.
Figure 13:
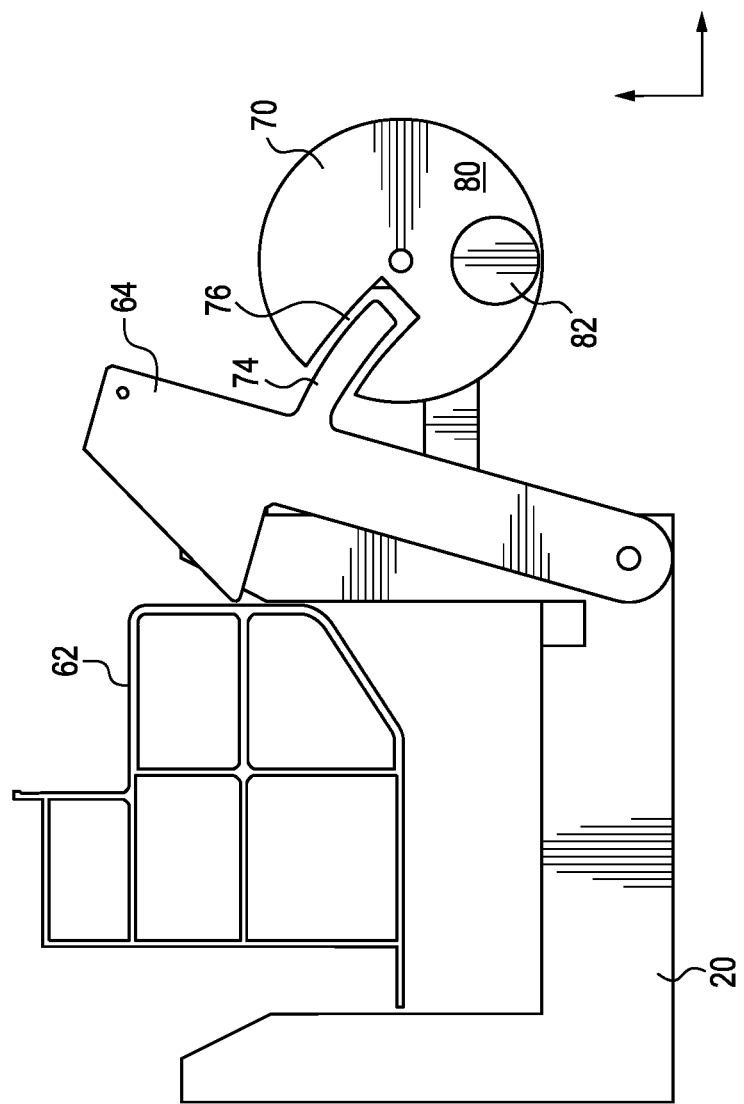
FIG. 13 is a front view showing a side sill being loaded into an alternate embodiment latching apparatus as the side sill moves the latch.

As illustrated in FIGS. 8-9, the front clamps 28 located on the front support 50 preferably slide into place to secure the frame 12 with the necessary three (3) points of contact 42,44,46. The front support 50 preferably is not permanently fixed in space so that it does not interfere with the loading and unloading of the motor vehicle frame 12 into the fixture 20. The motor vehicle frame 20 is loaded into the fixture 20 along the longitudinal axis 16 of the motor vehicle frame 20. The front support 50 includes a straight bar 52 attached to a swivel ball joint 54 so that it can be stored away when the fixture 20 is not in use. Attachment clamps 28 are preferably integrated into the straight bar 52 so that they can be easily engaged by a manufacturing associate to complete the three (3) points of contact 42,44,46 at the attachment points 35,36.

The fixture 20 preferably includes load guides 56 that align and guide the motor vehicle frame 12 into the fixture 20 and rear clamps 26 when loaded by the manufacturing associate.

In the embodiment illustrated in the figures, the entire fixture 20 is fixedly attached to the rotisserie 18 by a mounting plate 24. The transverse support 21 and supporting arms 22 of the fixture 20 are suspended from the mounting plate 24 to form a single attachment point that acts in a cantilever fashion. The mounting plate 24 is further attached to the rotisserie machine 18 by any means known to one skilled in the art. The rotisserie 18 is capable of raising and lower the fixture 20 in a vertical manner, as well as rotating the mounting plate 24, and thus the entire fixture 20, 360° along a longitudinal axis 16. The fixture 20 is wide enough that the so that the fixture supporting arms 22 remain to the outside of the motor vehicle body 14 do they do not interfere with the manufacturing processes.

The fixture 20 is preferably made of aluminum or stainless steel, which must be capable of securely holding a load of approximately 650 lbs. (295 kg). The farthest points of the fixture 20 away from the mounting plate 24 should preferably not deflect more than 25.4 mm per 4.572 meters (1 inch per 15 feet) in length of the motor vehicle frame 12.

Figure 14:
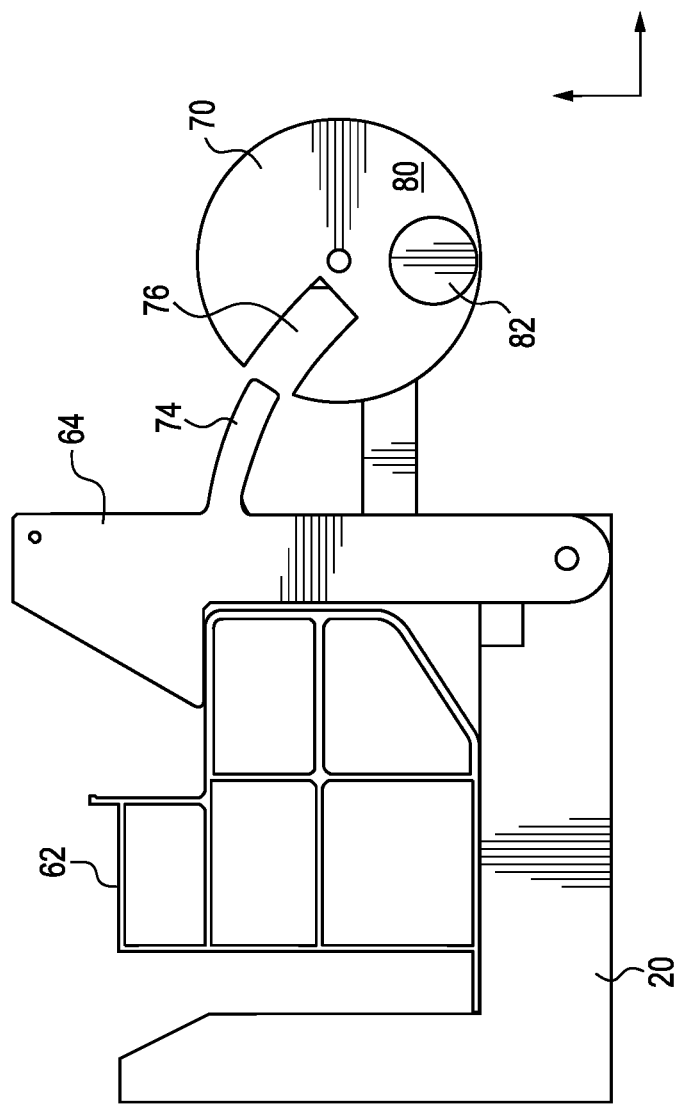
FIG. 14 is a front view showing a side sill being loaded into an alternate embodiment latching apparatus as the latch creates an interference fit with the side sill.
Figure 15:
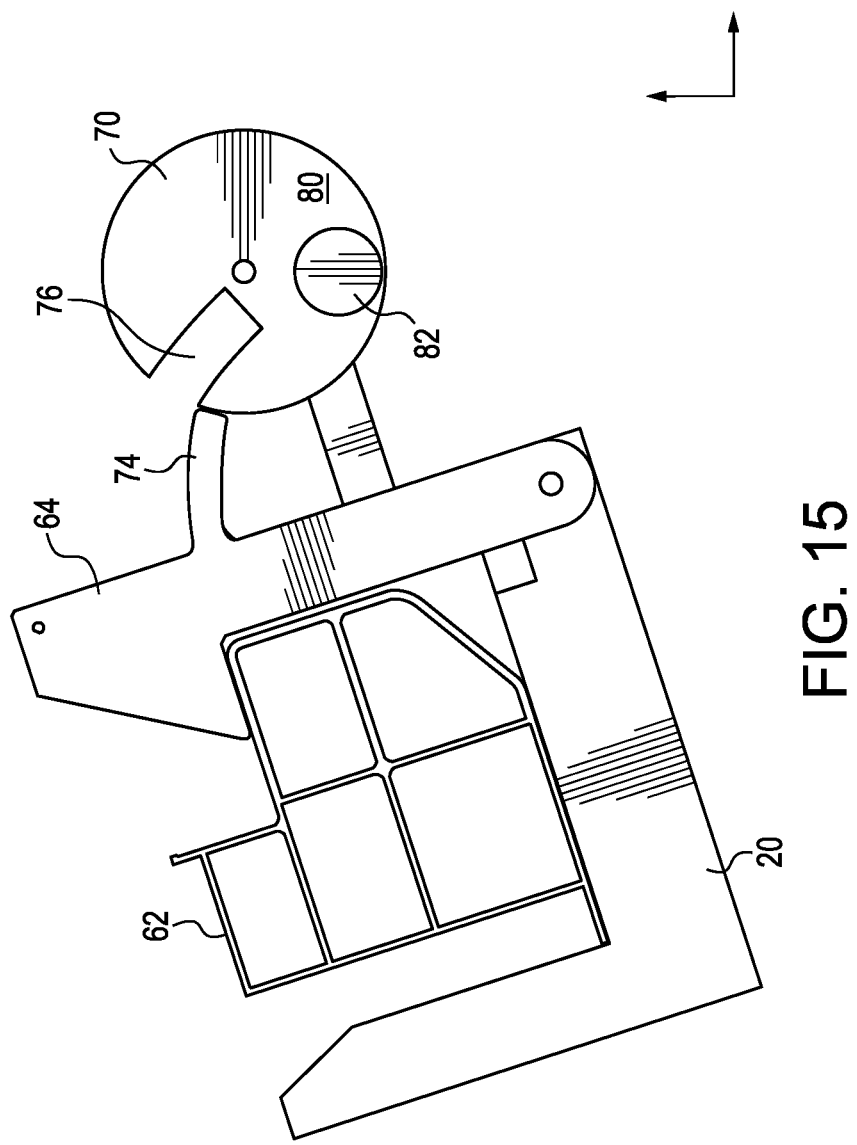
FIG. 15 is a front view showing the fixture and the alternate embodiment latching apparatus in a rotated position.

In an alternate embodiment illustrated in FIGS. 10-15, a motor vehicle frame 12 is positioned into fixture 20. The motor vehicle frame 12 is then locked or secured to the fixture 20 as previously described. In addition to or in place of one of the clamps 26,28 previously discussed, a passive latch apparatus 60 may be included on the fixture 20. The passive latch apparatus 60 is configured to securely lock the motor vehicle frame 12 on the fixture 20 so that the motor vehicle frame 12 cannot be accidentally released from the fixture 20. During the assembly process, a manufacturing associate lowers, for example, a side sill 62 of a motor vehicle frame 12 onto the fixture 20. As shown in FIG. 11-14, the side sill 62 urges a latch 64 to rotate about a rotational axis 66 and stretch or expand a latch spring 68 operatively coupling the latch 64 to the fixture 20. With the side sill 62 seated in the fixture 20, the latch spring 68 retracts to a biased position to pull the latch 64 into a locked position securing the side sill 62 within the fixture 20. As the rotisserie 18 rotates the fixture 20 to an optimal assembly position, illustrated in FIG. 15, a pendulum 70 coupled to the fixture 20 maintains its orientation relative to the horizontal, i.e., the factory floor, due to gravitational forces. The pendulum 70 is preferable a freely rotatable disk 80 with a weight 82 that causes the pendulum 70 to maintain a home position as the rest of the fixture 20 rotates. At a home position, a locking extension 74 on the latch may be mated with a slot 76 in the pendulum 70 when the latch 64 is disengaged from the side sill 62. At a rotisserie 18 rotation beyond 18°, the pendulum maintains 70 the latch 64 in a locked position, as shown in FIG. 15, to provide additional security in holding the motor vehicle frame 12 in place on the fixture 20. This is accomplished by the locking extension 74 and latch 64 rotating with the rest of the fixture, but the pendulum 70, and thus the slot 76, maintaining the home position relative to horizontal. Thus, the locking extension 74 is no longer aligned with slot 76. Locking extension 74 instead is held in place by the solid body of pendulum 70, preventing the latch 64 from disengaging from the side sill 62. When the fixture 20 rotates back to horizontal, the locking extension 74 is again is aligned with slot 76 in the pendulum 70. As the latch 64 is disengaged by pulling cord 72, the locking extension 74 rotates into slot 76, and the latch 64 disengages from the side sill 62.

When the rotisserie 18 returns the fixture 20 to the initial position, illustrated in FIG. 14, there is no danger of the motor vehicle frame 12 falling out of the fixture 20, and the pendulum 70 no longer acts as a latch 64 lock. The manufacturing associate may pull a release cable 72 coupled to a top portion of the latch 64 to pivot the latch 64 away from the side sill 62 of the motor vehicle frame 12, and the side sill 62 is lifted from the fixture 20. When the cable 72 is released, the latch spring 68 moves to the biased position.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. An apparatus for use in production of a motor vehicle to lift a frame of the motor vehicle and rotate the frame 360° about a longitudinal axis, comprising:
    a rotisserie fixed to a floor of a facitilty for producing the motor vehicle, the rotisserie comprising a fixed vertical portion and an adjustable portion that may be vertically raised and lowered and rotated about the longitudinal axis;
    a fixture connected to the adjustable portion of the rotisserie for holding the frame of the motor vehicle during production, the fixture being rotatable about the longitudinal axis, the fixture further comprising:
        a single mounting plate attached to the adjustable portion of the rotisserie, the fixture being solely attached to the rotisserie by the mounting plate such that the fixture is mounted to the rotisserie in a cantilever fashion;
        a support structure comprising a lateral support that connected to the mounting plate, first and second longitudinal arms having first ends connected to extending longitudinally from the lateral support, and a front support extending between second ends of the first and second longitudinal arms, wherein a first end of the front support is attached to the first longitudinal arm by a swivel ball joint and a second end of the front support is releasably connected to the second longitudinal arm;
        first and second clamps extending from the first ends of the first and second longitudinal arms for affixing the frame of the motor vehicle to the support structure; and
        third and fourth clamps extending from the front support for affixing the frame of the motor vehicle to the support structure, wherein the third and fourth clamps are engaged with the frame by inserting the swivel ball joint into a socket and sliding the third and fourth clamps into engagement with the frame.

2. The apparatus of claim 1 wherein the first and second clamps each comprise:
    a rear supporting clamp body;
    a side supporting clamp body; and
    a slidable clamp assembly that is movable to engage the frame to secure the frame in the fixture and to disengage from the frame to release the frame for removal from the fixture.

3. The apparatus of claim 2 wherein the slidable clamp assembly further comprises:
    an L-shaped clamp having a first end and a second end;
    a latching pin for engaging and disengaging the slidable clamp assembly; and
    wherein the latching pin is connected to the first end of the L-shaped clamp, and the second end of the L-shaped clamp contacts the frame to secure the frame to the fixture when engaged.

4. The apparatus of claim 1 wherein the third and fourth clamps are L-shaped and integral with the front support.

5. The apparatus of claim 1 wherein the fixture may be raised and lowered on the rotisserie.

6. The apparatus of claim 1 wherein the fixture is made of a material selected from the group that consists of aluminum, steel, and stainless steel.

7. The apparatus of claim 6 wherein portions of the first, second, third, and fourth clamps that engage the frame are made of plastic.

* * * * *